(12) United States Patent
Choi et al.

(10) Patent No.: US 8,836,171 B2
(45) Date of Patent: Sep. 16, 2014

(54) MODULATION CIRCUIT AND METHOD

(71) Applicant: ConvenientPower HK Ltd., Central (HK)

(72) Inventors: Wai Pong Choi, Kowloon (HK); Xun Liu, New Territories (HK)

(73) Assignee: ConvenientPower HK Ltd., Central (HK)

( * ) Notice: Subject to any disclaimer, the term of this patent is extended or adjusted under 35 U.S.C. 154(b) by 0 days.

(21) Appl. No.: 13/652,777

(22) Filed: Oct. 16, 2012

(65) Prior Publication Data
US 2013/0093256 A1    Apr. 18, 2013

Related U.S. Application Data

(60) Provisional application No. 61/548,590, filed on Oct. 18, 2011.

(51) Int. Cl.
*H01F 27/42* (2006.01)
*H02J 17/00* (2006.01)

(52) U.S. Cl.
CPC .................................... *H02J 17/00* (2013.01)
USPC ........... 307/104; 307/108; 307/151; 307/149; 307/140; 455/41.1; 455/334; 455/127.1; 455/44; 455/61; 320/108; 320/107; 320/115

(58) Field of Classification Search
USPC ....... 307/104, 132 M, 98, 125, 140, 108, 151, 307/149; 455/127.1, 334, 44, 61, 102, 41.1; 725/105; 320/108
See application file for complete search history.

(56) References Cited

U.S. PATENT DOCUMENTS

| | | | |
|---|---|---|---|
| 8,265,559 B2* | 9/2012 | Cooper et al. | 455/44 |
| 8,290,463 B2 | 10/2012 | Liu et al. | |
| 8,344,688 B2* | 1/2013 | Yoda et al. | 320/107 |
| 2010/0210207 A1* | 8/2010 | Goto et al. | 455/41.1 |
| 2010/0315039 A1 | 12/2010 | Terao et al. | |
| 2011/0065398 A1* | 3/2011 | Liu et al. | 455/127.1 |
| 2012/0146576 A1* | 6/2012 | Partovi | 320/108 |

FOREIGN PATENT DOCUMENTS

| | | |
|---|---|---|
| CN | 101924400 A | 12/2010 |
| JP | 2010-88143 A | 4/2010 |
| JP | 2010-288431 A | 12/2010 |

OTHER PUBLICATIONS

Patent Cooperation Treaty, International Search Report and Written Opinion, International Patent Application No. PCT/CN2012/083153, mailed Jan. 31, 2013, 9 pages.

* cited by examiner

Primary Examiner — Rexford Barnie
Assistant Examiner — Jagdeep Dhillon
(74) Attorney, Agent, or Firm — Fenwick & West LLP (57) ABSTRACT

The present invention provides a modulation circuit and a method for modulating a wireless power transfer circuit. The modulation circuit has a switching circuit having a first state and a second state. The modulation circuit also has a modulation mode in which the first state defines a normal state and the second state defines an operative state. In the operative state, the modulation circuit modulates an electrical parameter of the wireless power transfer circuit in a modulation direction. The modulation circuit is configured to apply a trial modulation to the electrical parameter to determine whether the modulation direction is in a desired modulation direction. The modulation circuit is also configured to apply a modulation translation if the modulation direction is not in the desired modulation direction, with the modulation translation changing the modulation mode such that the modulation direction is in the desired modulation direction.

21 Claims, 9 Drawing Sheets

MODULATION CIRCUIT AND METHOD

CROSS-REFERENCE TO RELATED APPLICATION

This application claims the benefit of U.S. Provisional Application No. 61/548,590, filed Oct. 18, 2011, which is hereby incorporated by reference in its entirety

FIELD OF THE INVENTION

The present invention relates to modulation circuits and methods, and in particular, those for modulating wireless power transfer circuits.

BACKGROUND OF THE INVENTION

Wireless power transfer is implemented with the combination of an energy transmitter which transfers power and an energy receiver which receives power. They are connected electromagnetically by inductive coupling, capacitive coupling or other coupling approaches. Communication normally occurs between the transmitter and the receiver for tasks such as device identification, power transfer contract negotiation and power transfer control. An economic way to implement such communication is to directly modulate the power that is being transferred, without adding extra communication channels. However, such power modulation can often introduce undesirable and unpredictable variations in power output which are not favored by many loads.

It is an object of the present invention to overcome or ameliorate at least one of the disadvantages of the prior art, or to provide a useful alternative.

SUMMARY OF THE INVENTION

The present invention provides, in a first aspect, a modulation circuit for modulating a wireless power transfer circuit, the modulation circuit having a switching circuit having a first state and a second state, the modulation circuit having a modulation mode in which the first state defines a normal state and the second state defines an operative state, wherein in the operative state, the modulation circuit modulates an electrical parameter of the wireless power transfer circuit in a modulation direction, the modulation circuit configured to apply a trial modulation to the electrical parameter to determine whether the modulation direction matches a desired modulation direction, and the modulation circuit configured to apply a modulation translation if the modulation direction does not match the desired modulation direction, the modulation translation changing the modulation mode such that the modulation direction matches the desired modulation direction.

In one embodiment, the switching circuit includes a switch, and the modulation circuit includes a modulating component connected in series with the switch, the modulating component and the switch forming a modulating unit. In one embodiment, the modulating component is a resistor or a capacitor.

In one embodiment, the modulating unit is connected between a wireless power transfer coil and a rectification circuit in the wireless power transfer circuit. In another embodiment, the modulating unit is connected between a rectification circuit and a load in the wireless power transfer circuit.

In one embodiment, the modulation translation swaps the first and second states such that the second state defines the normal state and the first state defines the operative state.

In one embodiment, the electrical parameter has a normal value in the normal state, and the value of the electrical parameter is modified before, in time, the modulation translation such that the electrical parameter has the normal value in the normal state after the modulation translation. In another embodiment, the electrical parameter has a normal value in the normal state, and the value of the electrical parameter is modified after, in time, the modulation translation such that the electrical parameter has the normal value in the normal state after the modulation translation.

In a further embodiment, the switching circuit also has a third state. In one embodiment, the modulation translation swaps the second and third states such that the third state defines the operative state.

In one embodiment, the switching circuit includes two switches each having on and off states, the two switches in combination defining the first, second, and third states.

In one embodiment, the electrical parameter has a modulated value in the operative state and a trial modulation value during the trial modulation, the trial modulation value being smaller than the modulated value.

The electrical parameter can be voltage, current, or power. In one embodiment, the modulation direction is one of increasing or decreasing the electrical parameter.

In one embodiment, the modulation circuit includes a modulation controller that applies a trial modulation to the electrical parameter to determine whether the modulation direction matches a desired modulation direction, and applies a modulation translation if the modulation direction differs from the desired modulation direction, the modulation translation changing the modulation mode such that the modulation direction matches the desired modulation direction.

In one embodiment, the wireless power transfer circuit is a wireless power receiver circuit. In another embodiment, the wireless power transfer circuit is a wireless power transmitter circuit.

In a second aspect, the present invention provides a method of modulating a wireless power transfer circuit, the method including: in an operative state, modulating an electrical parameter of the wireless power transfer circuit in a modulation direction; applying a trial modulation to the electrical parameter to determine whether the modulation direction matches a desired modulation direction; and applying a modulation translation if the modulation direction differs from the desired modulation direction, the modulation translation changing the modulation mode such that the modulation direction matches the desired modulation direction.

In one embodiment, the electrical parameter is modulated in the operative state by using a modulation circuit having a switching circuit having a first state and a second state, wherein in a modulation mode, the first state defines a normal state and the second state defines the operative state, and wherein the modulation translation is applied by swapping the first and second states such that the second state defines the normal state and the first state defines the operative state.

In one embodiment, the electrical parameter has a normal value in the normal state, and the method includes modifying the value of the electrical parameter before, in time, the modulation translation such that the electrical parameter has the normal value in the normal state after the modulation translation. In another embodiment, the electrical parameter has a normal value in the normal state, and the method includes modifying the value of the electrical parameter after, in time, the modulation translation such that the electrical parameter has the normal value in the normal state after the modulation translation.

In a further embodiment, the electrical parameter is modulated in the operative state by using a modulation circuit having a switching circuit having a first state, a second state, and a third state, and wherein in a modulation mode, the first state defines a normal state and the second state defines the operative state.

In one embodiment, the modulation translation is applied by swapping the second and third states such that the third state defines the operative state.

BRIEF DESCRIPTION OF THE FIGURES

Preferred embodiments in accordance with the best mode of the present invention will now be described, by way of example only, with reference to the accompanying figures, in which.

DETAILED DESCRIPTION OF THE BEST MODE OF THE INVENTION

Referring to the figures, a preferred embodiment of the present invention provides modulation circuit 1 having a switching circuit 2 having a first state and a second state. The modulation circuit 1 has a modulation mode in which the first state defines a normal state and the second state defines an operative state. In the operative state, the modulation circuit 1 modulates an electrical parameter 3 of a target circuit 4 in a modulation direction. The modulation circuit 1 is configured to apply a trial modulation to the electrical parameter 3 to determine whether the modulation direction matches (e.g., is in) a desired modulation direction. The modulation circuit 1 is configured to apply a modulation translation if the modulation direction differs from (e.g., does not match or is not in) the desired modulation direction, with the modulation translation changing the modulation mode such that the modulation direction is in the desired modulation direction.

Figure 2A:
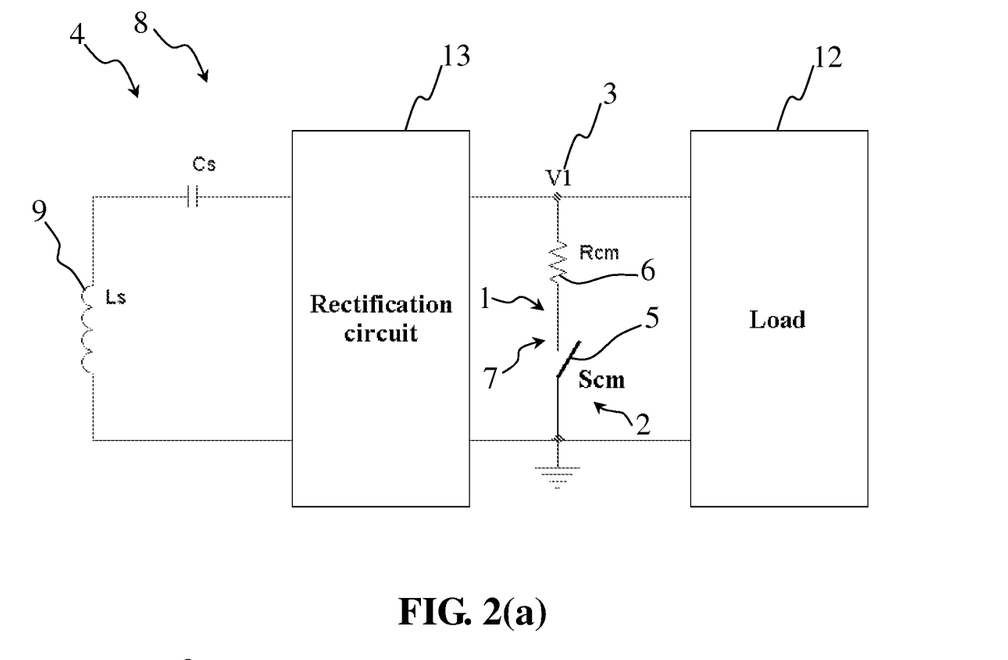
FIG. 2(a) is a schematic circuit diagram of a modulation circuit in accordance with a preferred embodiment of the invention in which the modulation circuit includes a switch connected in series with a resistor.
Figure 2B:
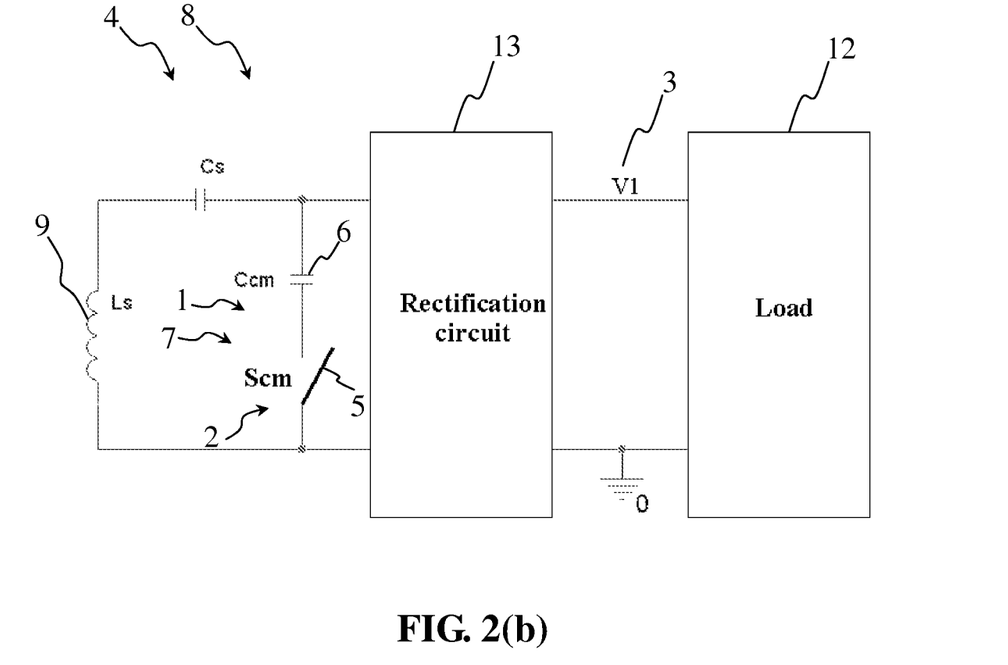
FIG. 2(b) is a schematic circuit diagram of a modulation circuit in accordance with another preferred embodiment of the invention in which the modulation circuit includes a switch connected in series with a capacitor.

In some embodiments, the switching circuit 2 includes a switch 5, and the modulation circuit 1 includes a modulating component 6 connected in series with the switch, the modulating component and the switch forming a modulating unit 7. In one embodiment, as shown in FIG. 2(a), the modulating component 6 is a resistor. In another embodiment, as shown in FIG. 2(b), the modulating component 6 is a capacitor. As will be appreciated, the operation of the switch 5 connects or disconnects the modulating component 6 to or from the target circuit 4, thereby modulating the target circuit 4, and more specifically, the electrical parameter 3. It will also be appreciated that any component suitable for modulating an electrical parameter of the target circuit 4 can be utilized as the modulating component 6.

In one embodiment, the modulation translation swaps the first and second states such that the second state defines the normal state and the first state defines the operative state. For example, the electrical parameter 3 can be voltage in the target circuit 4, and the desired modulation direction can be increasing the voltage. If the trial modulation determines that the second state of the switching circuit 2 decreases the voltage, that is, the modulation direction is not in the desired modulation direction, then the first and second states are swapped such that the second state defines the normal state and the first state defines the operative state.

This, however, means that in the normal state after, in time, the first and second states are swapped the voltage will be decreased compared to the voltage in the normal state before, in time, the first and second states are swapped. This may not be desirable if the voltage needs to have a normal value which is the voltage value in the normal state before, in time, the first and second states are swapped.

Therefore, in one embodiment, where the electrical parameter has a normal value in the normal state, the value of the electrical parameter is modified before, in time, the modulation translation such that the electrical parameter has the normal value in the normal state after the modulation translation. In the example above, the voltage is modified by increasing its value before, in time, the first and second states are swapped, as shown in FIG. 6(c).

In another embodiment, where the electrical parameter has a normal value in the normal state, the value of the electrical parameter is modified after, in time, the modulation translation such that the electrical parameter has the normal value in the normal state after the modulation translation. In the example above, the voltage is modified by increasing its value after, in time, the first and second states are swapped, as shown in FIG. 6(b).

In another embodiment, the switching circuit 2 also has a third state. In this embodiment, the modulation translation swaps the second and third states such that the third state defines the operative state. In making the operative state the third state, the modulation direction is changed into the desired modulation direction.

In one embodiment, the switching circuit 2 includes two switches 5 each having on and off states, the two switches in combination defining the first, second, and third states. For example, having one switch on and the other switch off defines the first state, having both switches off defines the second state, and having both switches on defines the third state. Assume that the electrical parameter 3 is again voltage in the target circuit 4. Therefore, the second state of the switching circuit 2 either increases or decreases the voltage, and the third state of the switching circuit 2 does the opposite. Assume, again, that the desired modulation direction is increasing the voltage. If the trial modulation determines that the second state of the switching circuit 2 decreases the voltage, that is, the modulation direction is not in the desired modulation direction, then the second and third states are swapped such that the third state defines the operative state, in which voltage increases.

It is preferred that the electrical parameter 3 has a modulated value in the operative state and a trial modulation value during the trial modulation, and that the trial modulation value is smaller than the modulated value. This has the advantage that the trial modulation, even if it does not modulate the electrical parameter 3 in the desired modulation direction, only has a limited effect on the target circuit 4.

The electrical parameter 3 can be any electrical parameter of the target circuit 4 that is suitable for the purposes of modulation, and can be electrical parameters such as current, power, and voltage, as described above. As described above, the modulation direction can be one of increasing or decreasing the electrical parameter 3. However, any characteristic of the electrical parameter that can be suitably changed for the purposes of modulation can be utilized.

In one embodiment, the modulation circuit includes a modulation controller that applies the trial modulation to the electrical parameter to determine whether the modulation direction is in the desired modulation direction, and applies the modulation translation if the modulation direction is not in the desired modulation direction, the modulation translation changing the modulation mode such that the modulation direction is in the desired modulation direction.

The present invention is particularly suited for modulating a wireless power transfer circuit, that is, the target circuit 4 is a wireless power circuit. In some embodiments, the target circuit 4 is a wireless power receiver circuit, whilst in other embodiments, the target circuit 4 is a wireless power transmitter circuit. Particular examples of such embodiments will now be described in more detail.

Wireless power transfer is implemented with the combination of a wireless power or energy transmitter (simply referred to as a "transmitter") which transfers power and a wireless power or energy receiver (simply referred to as a "receiver") which receives power. They are coupled electromagnetically by inductive coupling, capacitive coupling or other coupling approaches. Communication normally occurs between the transmitter and the receiver for tasks such as device identification, power transfer contract negotiation and power transfer control. An economic way to implement such communication is to directly modulate the power that is being transferred, without adding extra communication channels.

Figure 1:
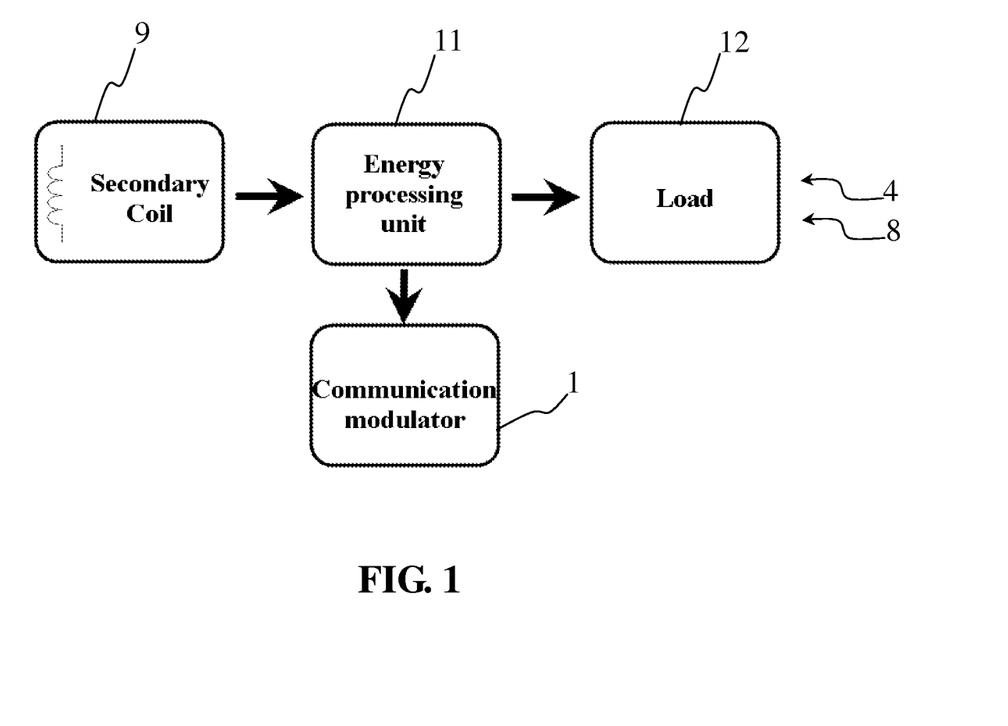
FIG. 1 is a block diagram of a modulation circuit in accordance with a preferred embodiment of the invention in which the modulation circuit modulates a wireless power receiver circuit.

FIG. 1 shows the function block diagram of a receiver having a wireless power receiver circuit 8. A wireless power transfer coil 9 in the form of a secondary coil receives power wirelessly when it is coupled with a transmitter having a wireless power transmitter circuit 10. The received power is normally in the alternating current (AC) form. An energy processing unit 11 transforms the received power into the desired form which is suitable to power the load 12. An example of the energy processing unit 11 is a rectification circuit 13. A communication modulator directly modulates the power that is being transferred. The communication modulator includes, or is in the form of, the modulation circuit 1 described above. The modulation circuit 1 modulates one of the electrical parameters of the wireless power receiver circuit 8 which varies one or more electrical parameters of the wireless power transmitter circuit. In this case then, the wireless power receiver circuit 8 is the target circuit 4 as described above.

The variation of one or more electrical parameters of the wireless power transmitter circuit 10 can be monitored and demodulated by the transmitter so that information is communicated from the receiver to the transmitter. A similar arrangement in which the modulation circuit 1 is included in the transmitter to modulate the wireless power transmitter circuit 10 can also be used for communication from the transmitter to the receiver, which will be explained in further detail later.

Two representative modulation circuits 1 are shown in FIG. 2. As described above, FIG. 2(*a*) shows one embodiment of the modulation circuit 1 in which the modulating component 6 is a resistor (Rcm) which is connected in series with the switch 5 (Scm). In this embodiment, the modulating unit 7 formed by the resistor (Rcm) and the switch (Scm) is placed after the rectification circuit 13 before the load 12. Thus, this arrangement can be considered as direct current (DC) power modulation. Also as described above, FIG. 2(*b*) shows another embodiment of the modulation circuit 1 in which the modulating component 6 is a capacitor (Ccm) which is connected in series with the switch 5 (Scm). In this embodiment, the modulating unit 7 formed by the capacitor (Ccm) and the switch (Scm) is placed before the rectification circuit 13 after the wireless power transfer coil 9. Thus, this arrangement can be considered as alternating current (AC) power modulation. In the embodiments shown in FIGS. 2(*a*) and 2(*b*), the electrical parameter 3 of the wireless power receiver circuit being modulated by the modulation circuit 1 is voltage.

Figure 3A:
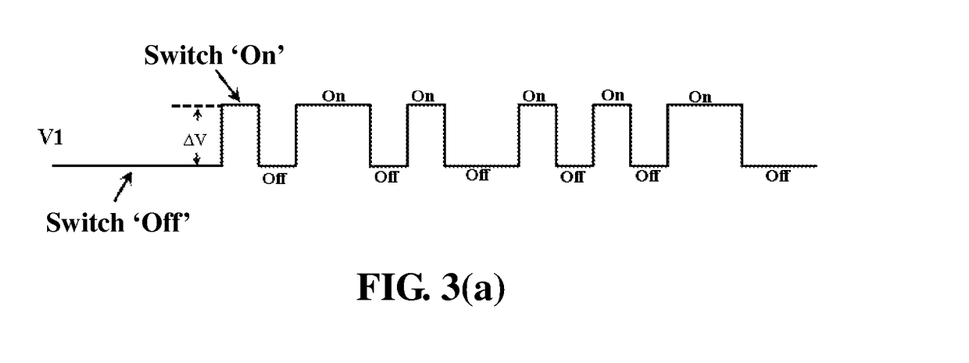
FIG. 3(a) is a graph with respect to time of an electrical parameter, V1, after modulation by one of the modulation circuits in FIG. 2(a) or FIG. 2(b), in which the electrical parameter rises in an operative state of the modulation circuit.
Figure 3B:
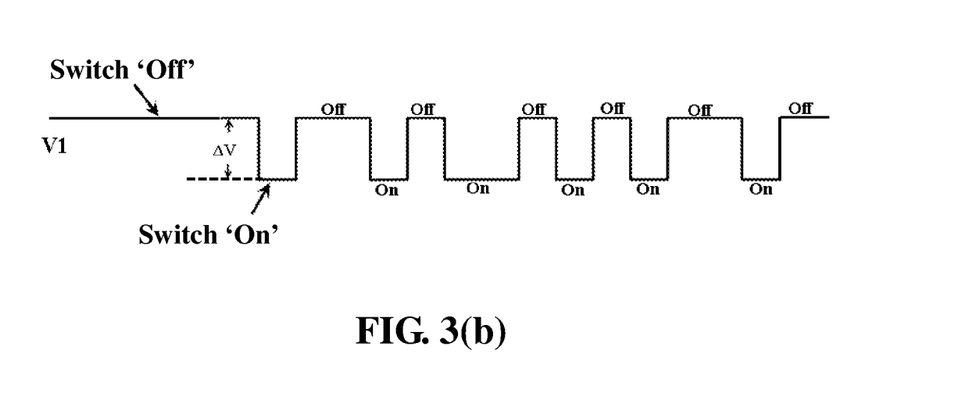
FIG. 3(b) is a graph with respect to time of the electrical parameter, V1, after modulation by one of the modulation circuits in FIG. 2(a) or FIG. 2(b), in which the electrical parameter drops in an operative state of the modulation circuit.

No matter in which form, there can be undesirable and unpredictable voltage variations observed at the output of the rectification circuit ("V1" in FIG. 2) which is also the input voltage to the load 12. FIG. 3 shows the typical waveform of V1 when the switch 5 is switched "On" and "Off". Here, when the switch 5 is "Off" it refers to the switch 5 when it is open, and when the switch 5 is "On" it refers to the switch 5 when it is closed.

The voltage variation can be observed in FIG. 3. Undesirably, the modulation direction of V1 ("rising", as shown in FIG. 3(*a*), or "dropping" as shown in FIG. 3(*b*)) is unknown as this is influenced by the coupling with different types of transmitters, the loading conditions and other parameters. Such voltage variation is unacceptable by many types of loads, especially for those which require a constant input voltage. For example, for charging circuits of many mobile devices, a strict input voltage range of 5V±5% is required. For these applications, the circuit as shown in FIG. 2 cannot be directly applied.

Figure 4A:
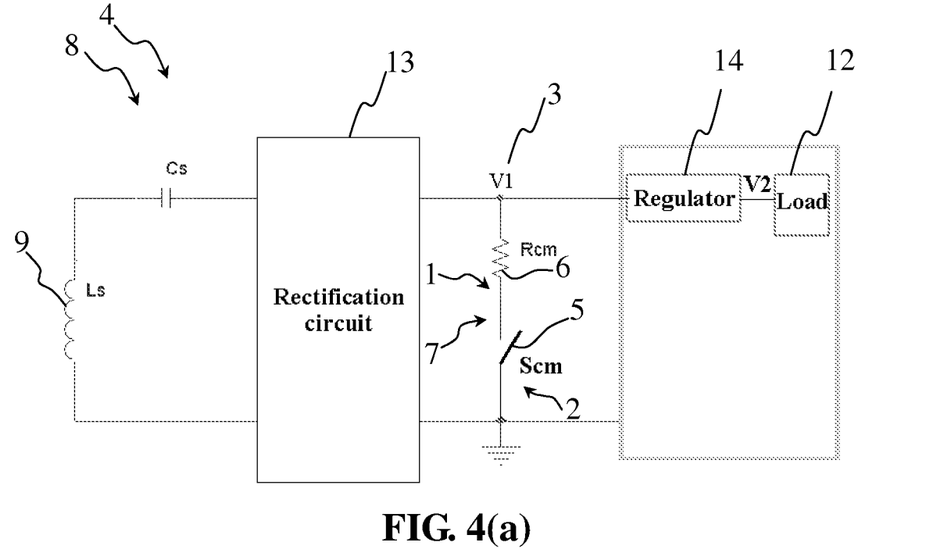
FIG. 4(a) is a schematic circuit diagram of the modulation circuit of FIG. 2(a) in which the modulation circuit modulates a wireless power receiving circuit having a regulator.
Figure 4B:
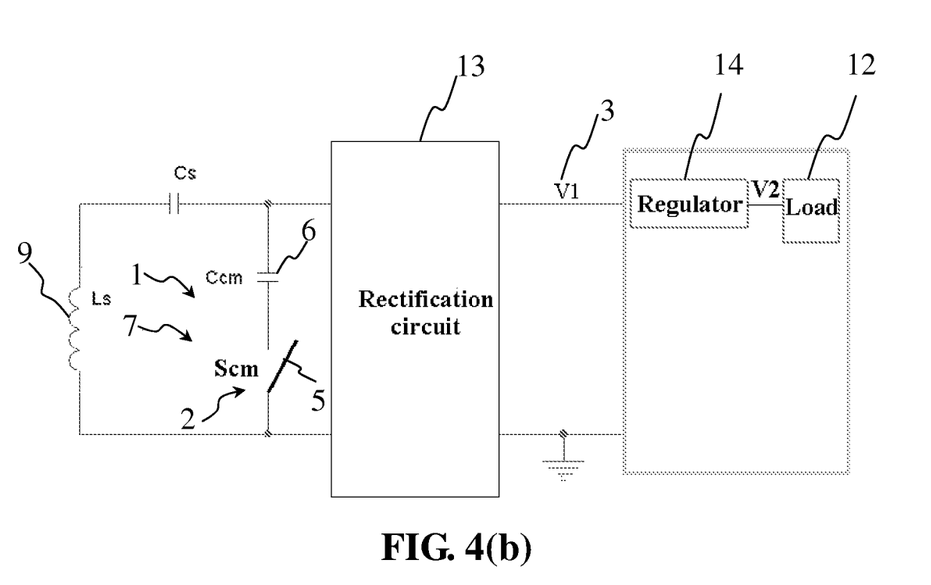
FIG. 4(b) is a schematic circuit diagram of the modulation circuit of FIG. 2(b) in which the modulation circuit modulates a wireless power receiving circuit having a regulator.
Figure 5A:
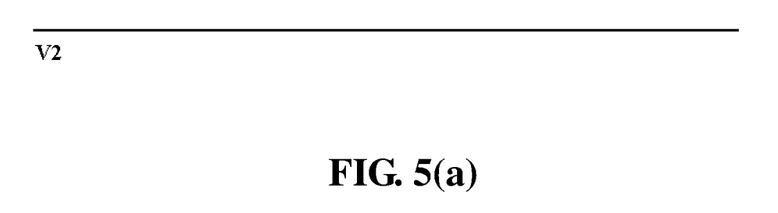
FIG. 5(a) is a graph with respect to time of the electrical parameter, V2, after modulation by one of the modulation circuits in FIG. 4(a) or FIG. 4(b) and after regulation by the regulator of the wireless power receiving circuit, in which the electrical parameter (V1 before regulation) rises in an operative state of the modulation circuit.

FIG. 4 shows a wireless power receiver circuit in which a regulator 14 is inserted between the load 12 and the rectification circuit 13. The regulator 14 functions as a buffer to tolerate the voltage variation of the output voltage of the rectification circuit (V1), and to generate a constant voltage (V2) to power the load. The regulator can be implemented by a Buck converter, or more commonly, a linear regulator. It must be noted that as the Buck converter and the linear regulator are both step-down regulators, V1 is required to be higher than V2 to effectively regulate the output voltage. This can be achieved by controlling the transmitter with the power requirement feedback communicated from the receiver to the transmitter. FIG. 5(*a*) shows the waveform of V2 which is the desired constant voltage to power the load. It must be noted that this constant voltage can only be achieved under either of the following two conditions:

(i) V1 rises when switch 5 is "On", as shown in FIG. 3(*a*). Under this condition, V1 is always higher than V2. Any voltage rise due to the modulation can be tolerated by the regulator 14.

(ii) V1 is controlled to be sufficiently high so that even the voltage drop ("ΔV" in FIG. 3(*b*)) does not cause V1 to be lower than V2. One drawback of this method is that the efficiency of the regulator 14 will be low because the power loss in the regulator due to the voltage difference between V1 and V2 will be significant, especially if it is implemented by a linear regulator. A lot of energy is wasted in the regulator 14 instead of going into the load 12.

Figure 5B:
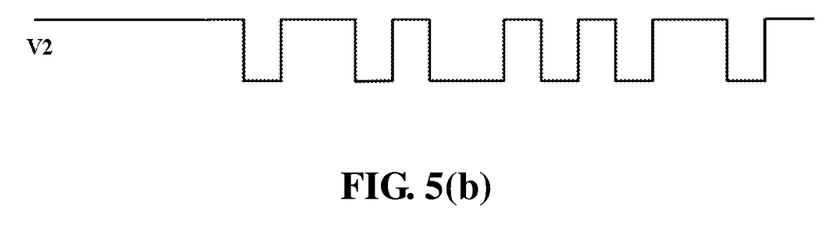
FIG. 5(b) is a graph with respect to time of the electrical parameter, V2, after modulation by one of the modulation circuits in FIG. 4(a) or FIG. 4(b) and after regulation by the regulator of the wireless power receiving circuit, in which the electrical parameter (V1 before regulation) drops in an operative state of the modulation circuit.

In practice, as the modulation direction (rise or drop) of V1 and the magnitude of the variation of V1 are both unknown, the above two conditions are difficult to meet. So the waveform of V2, as shown in FIG. 5(*b*), can still be observed, if V1 has the waveform shown in FIG. 3(*b*) and V1 is not controlled to be sufficiently high. The desired constant input voltage to the load 12 is still not reliably achieved.

Figure 6A:
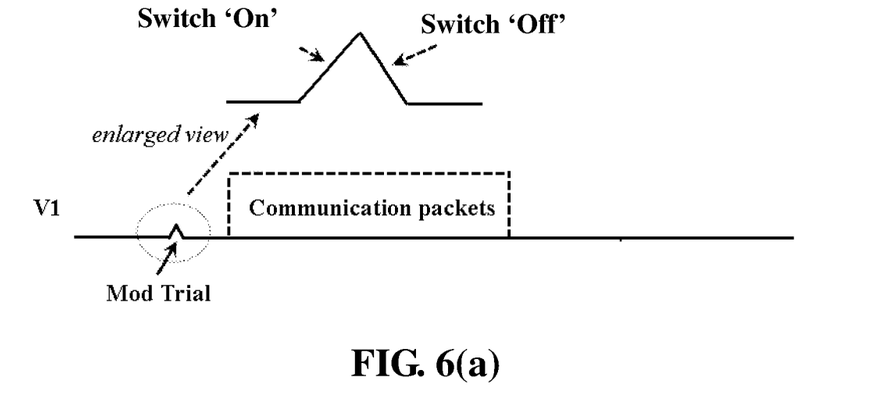
FIG. 6(a) is a graph with respect to time of an electrical parameter, V1, showing the application of a trial modulation by one of the modulation circuits in FIG. 4(a) or FIG. 4(b), in which the trial modulation shows that the modulation direction is in a desired modulation direction.
Figure 6B:
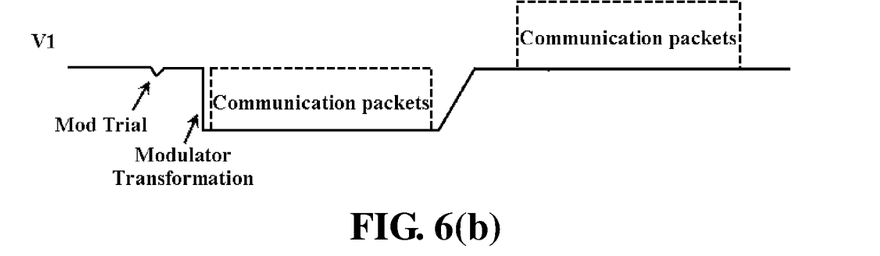
FIG. 6(b) is a graph with respect to time of the electrical parameter, V1, showing the application of a trial modulation and a modulation transformation by one of the modulation circuits in FIG. 4(a) or FIG. 4(b), in which the trial modulation shows that the modulation direction is not in a desired modulation direction, and the value of the electrical parameter is modified after the modulation transformation.
Figure 6C:
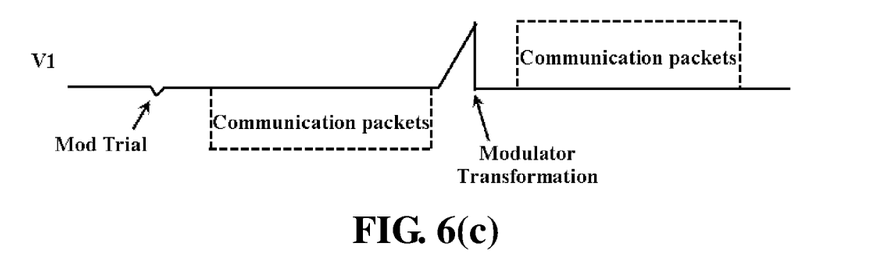
FIG. 6(c) is a graph with respect to time of the electrical parameter, V1, showing the application of a trial modulation and a modulation transformation by one of the modulation circuits in FIG. 4(a) or FIG. 4(b), in which the trial modulation shows that the modulation direction is not in a desired modulation direction, and the value of the electrical parameter is modified before the modulation transformation.

FIG. 6 shows one embodiment to address this problem. As described above, before, in time, communication modulation is to be applied to the wireless power receiver circuit 8, a trial modulation (labeled "Mod Trial") is applied to test the direction of the voltage variation. As shown in FIG. 6(*a*), the "Mod Trial" is applied by switching the switch 5 from "Off" to "On" and then to "Off" in a very short time (much shorter than normal modulation time). The first state described above is when the switch 5 is "Off", and the second state described above is when the switch 5 is "On". In the present modulation mode, the "Off" state defines the normal state described above, and the "On" state defines the operative state described above. The voltage V1 variation is monitored. If V1 is rising then dropping, it means that the modulation direction is in the desired modulation direction and the modulation mode is correct, and communication can continue in this manner. However, if the "Mod Trial" shows a drop and then a rise as shown in FIG. 6(*b*) and FIG. 6(*c*), it means that the modulation mode needs to be changed.

As described above, the modulation circuit 1 applies a modulation transformation (labeled "Modulator Transformation") after the "Mod Trial". The "Modulator Transformation" means the swapping or exchange of the "On" and "Off" states of the switch 5. For example, if the original operative state is when the switch 5 (Scm) is "On" (closed) and the normal state is when the switch 5 (Scm) is "Off" (open), then after "Modulator Transformation" the operative state is changed to when the switch 5 (Scm) is "Off" (open) and the normal state is changed to when the switch 5 (Scm) is "On" (closed).

It must be noted that at the moment of "Modulator Transformation", V1 will drop, as shown in FIG. 6(*b*). However, in the upcoming communication packets, the wireless power receiver circuit 8 can inform and control the wireless power transmitter circuit 10 to increase its output power so that V1 rises back to the normal value in the original normal state. After that, the modulation mode will be correct and the modulation circuit will be in its desired form. The advantage of this method is that since the voltage (V1) drop is only within a short time period (in "Mod Trial" as well as in the next communication packet), its impact on the normal operation of the load is minimal.

In another embodiment as shown in FIG. 6(*c*), after the "Mod Trial", the modulation circuit 1 does not apply a modulation transformation to switch the "On" and "Off" states to change the modulation mode. Instead, it does communication modulation with its original modulation mode in the upcoming packets. In the communication packets, the wireless power receiver circuit 8 can inform and control the wireless power transmitter circuit to increase its output power so that V1 rises to a sufficiently high value. Once V1 reaches the sufficiently high value, the modulation circuit 1 applies the "Modulator Transformation", that is, swapping the "On" and "Off" states of the switch 5 as described above. At the moment of "Modulator Transformation", V1 drops to or close to its normal value in the original normal state, and after that, the modulation mode is correct and the modulation circuit 1 is in its desired form.

It must be noted that if next time the "Mod Trial" finds a wrong modulation direction again, the modulation mode needs to be transformed by a modulation transformation again. It must also be noted that normally the load is relatively stable (does not change too much, too quickly), so the modulation transformation does not need to be applied often.

Figure 7A:
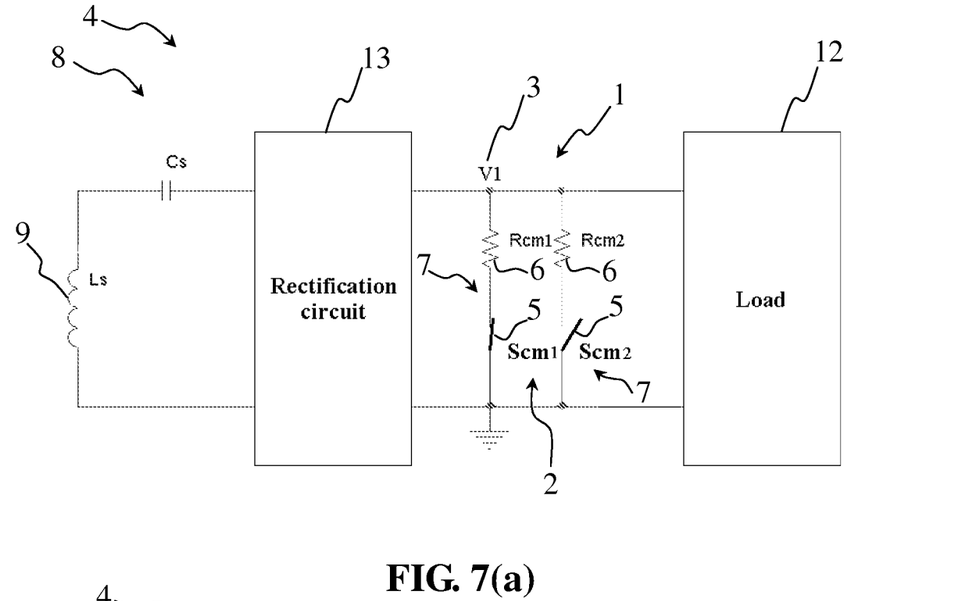
FIG. 7(a) is a schematic circuit diagram of a modulation circuit in accordance with a preferred embodiment of the invention in which the modulation circuit includes two switches each connected in series with a respective resistor.
Figure 7B:
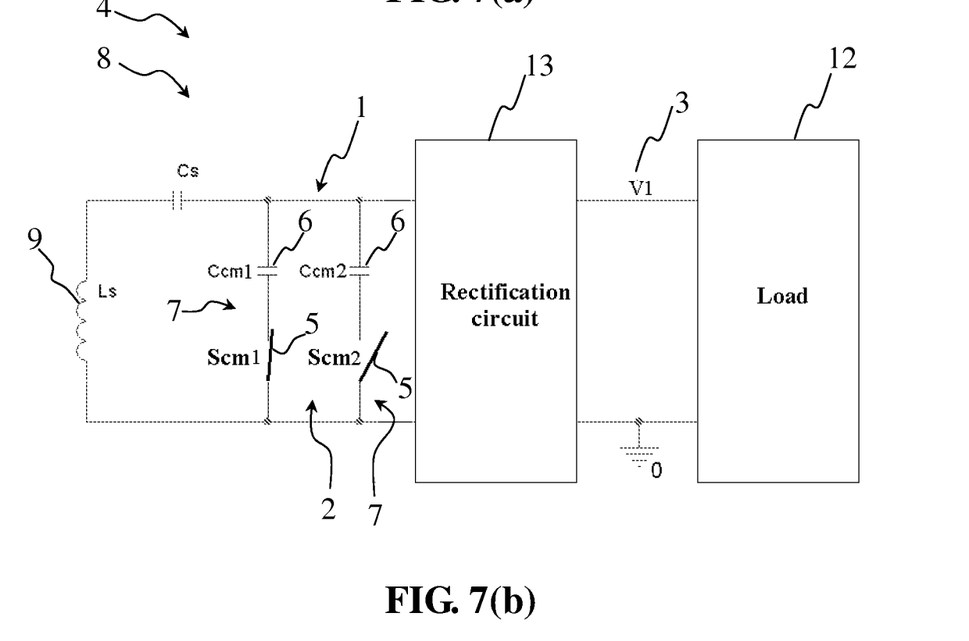
FIG. 7(b) is a schematic circuit diagram of a modulation circuit in accordance with another preferred embodiment of the invention in which the modulation circuit includes two switches each connected in series with a respective capacitor.
Figure 8:
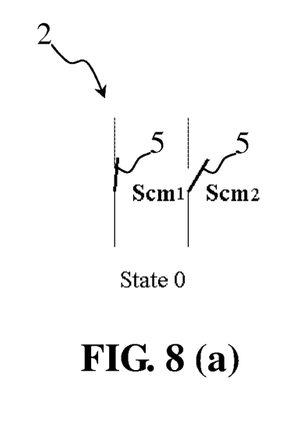
FIGS. 8(a) to 8(c) are schematic diagrams showing the three states of each of the combinations of two switches shown in FIGS. 7(a) and 7(b), respectively.

One issue with the above embodiments shown in FIG. 6 is that there is still a voltage drop, although it is within a short time period in the first upcoming communication packets after the "Mod Trial". An improvement to address this issue is shown in the embodiments in FIG. 7. As shown in FIG. 7, the modulation circuit 1 is in the form of a so-called "double modulator" which consists of two switches (Scm1 and Scm2) and two modulating components 6. In FIG. 7(*a*) the two modulating components 6 are two resistors (Rcm1 and Rcm2). In FIG. 7(*b*) the two modulating components 6 are two capacitors (Ccm1 and Ccm2). FIG. 8 shows the states of the two switches, which form the switching circuit 2. Having one switch open and one switch closed, as shown in FIG. 8(*a*), represents the first state (labeled "State 0"), which also defines the normal state. The second state (labeled "State 1") is when both switches are open, as shown in FIG. 8(*b*), and defines the operative state in the present modulation mode. Having both switches closed, as shown in FIG. 8(*c*), represents the third state described previously.

Figure 9A:
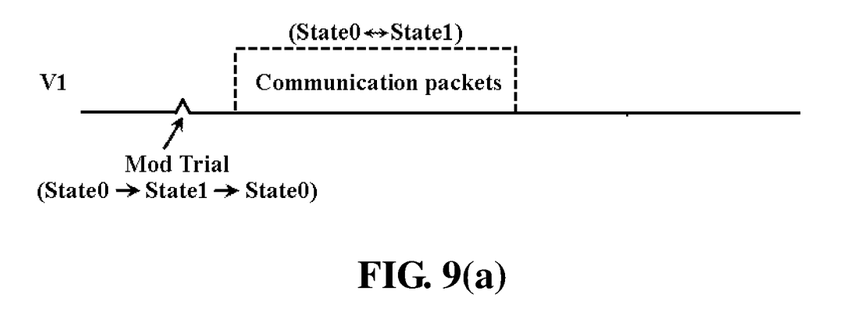
FIG. 9(a) is a graph with respect to time of an electrical parameter, V1, showing the application of a trial modulation by one of the modulation circuits in FIG. 7(a) or FIG. 7(b), in which the trial modulation shows that the modulation direction is in a desired modulation direction.

The operation of the "double modulator" is illustrated in FIG. 9. As shown in FIG. 9(*a*), the "Mod Trial is done by switching from State 0 to State 1 and then back to State 0. If V1 rises and then drops, it means that the operative state being defined by State 1 is correct, and the present modulation mode is correct. Then in the upcoming communication, the modulation circuit 1 proceeds with modulation by switching between State 0 and State 1, and V1 is in its desired form.

Figure 9B:
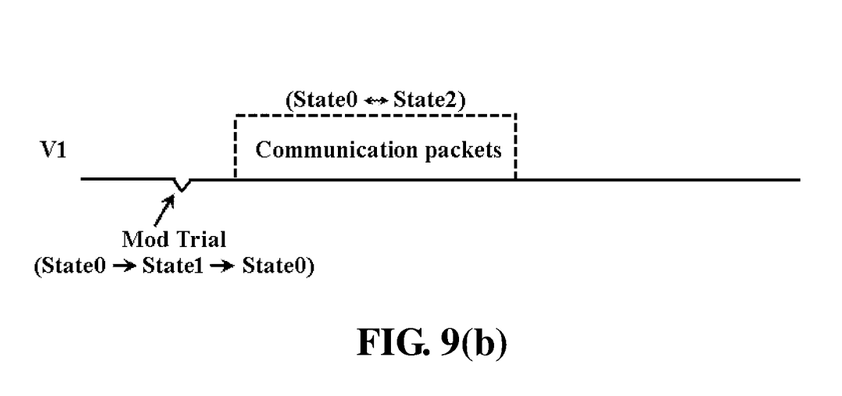
FIG. 9(b) is a graph with respect to time of an electrical parameter, V1, showing the application of a trial modulation by one of the modulation circuits in FIG. 7(a) or FIG. 7(b), in which the trial modulation shows that the modulation direction is not in a desired modulation direction, and the respective modulation circuit applies a modulation transformation.

On the other hand, as shown in FIG. 9(*b*), if the "Mod Trial", which is done by switching from State 0 to State 1 and then back to State 0, shows V1 dropping and then rising, it means that the operative state being defined by State 1 is wrong. Instead, the operative state should be defined by State 2. So, in the upcoming communication, the modulation circuit 1 should proceed with modulation by switching between State 0 and State 2. Thus, a modulation transformation is applied to change the modulation mode so that the operative state is defined by State 2. V1 will be in its desired form.

It must be noted, however, that the modulation circuit is not restricted to two switches, and can be more than two.

All of the above embodiments describe applications in which the rise of V1 is the desired modulation direction in communication modulation. In particular, this allows a constant output voltage V2 to be achieved after the regulator 14. In some other applications, however, a drop of V1 is desired in communication modulation. For example, in one application, the output of the rectification circuit 13 as shown in FIG. 2 can be directly connected to a Li-ion battery to charge it. When the battery is in the constant voltage (CV) charging mode (sometimes called "saturation charge"), the output voltage of the rectification circuit needs to be controlled to be as close as possible to, for example, 4.2V for 1-cell, with, for example, an allowed range of +/−50 mV. If the voltage is sometimes lower than the range, it does not have an adverse impact on the battery pack.

However, if the voltage is higher than the required range, it not only reduces the service life of the battery, but more importantly, it may result in a safety issue. So, opposite to the previous applications, the waveform in FIG. 3(*b*) is desired.

V1 needs to be controlled to be within the acceptable range. During communication modulation, V1 needs to go down instead of going up.

To achieve this, the "Mod Trial" in FIG. 6 and FIG. 9 needs to find V1 dropping and then rising as the desired modulation direction. If the modulation direction is not the desired modulation direction, a "Modulation Transformation" to swap the first and second states, as in FIG. 6, or to swap the second and third states, as in FIG. 9, needs to be applied.

The presently disclosed embodiments in no way exclude other modulation circuits or methods which result in some parameter variation on the receiver side, and in which the modulation direction of one or more parameters is desired to be known and controlled. In addition, the monitored electrical parameter is not limited to voltage (V1). It can be current, power, or any other suitable parameter.

Figure 10:
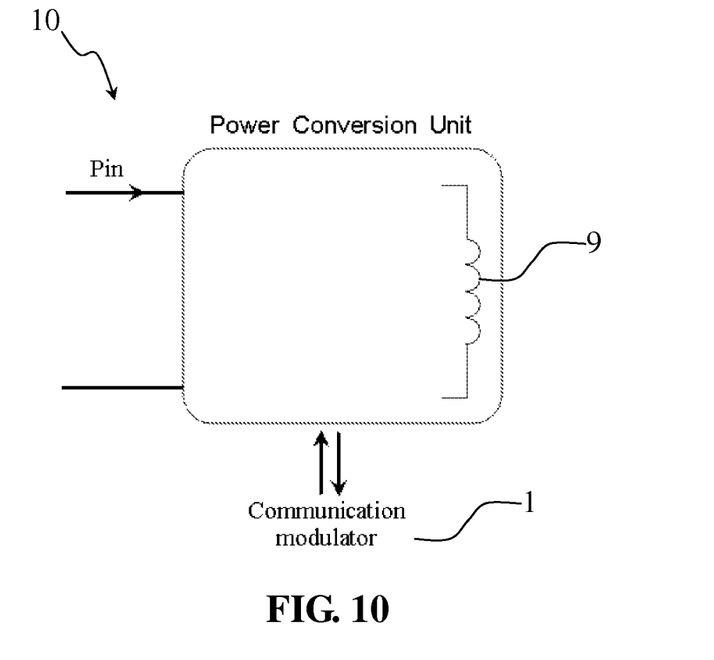
FIG. 10 is a block diagram of a modulation circuit in accordance with a preferred embodiment of the invention in which the modulation circuit modulates a wireless power transmitter circuit.

The same principle can also be applied to communication from the transmitter to the receiver. A block diagram of a transmitter is shown in FIG. 10, in which the Power Conversion Unit transfers the input DC power, Pin, in the right form to drive the transmitter winding(s). Communication from the transmitter to the receiver can be achieved by using the modulation circuit 1 described above to modulate the wireless power transmitter circuit 10 in the transmitter. Communication can be in the form of ASK, FSK, or any other modulation type. Such communication modulation can also vary one or more electrical parameters on the receiver side which may not be desirable for the load.

Figure 11A:
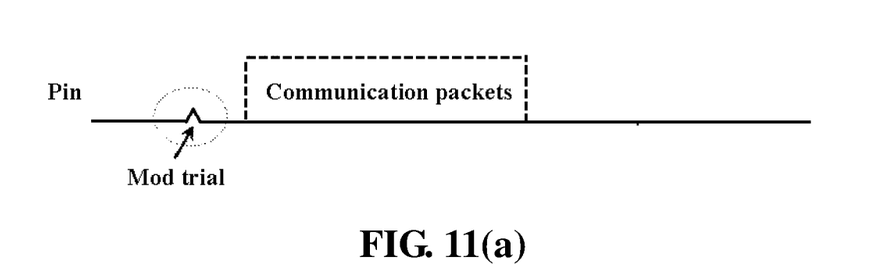
FIG. 11(a) is a graph with respect to time of an electrical parameter, Pin, showing the application of a trial modulation by the modulation circuit in FIG. 10, in which the trial modulation shows that the modulation direction is in a desired modulation direction.
Figure 11B:
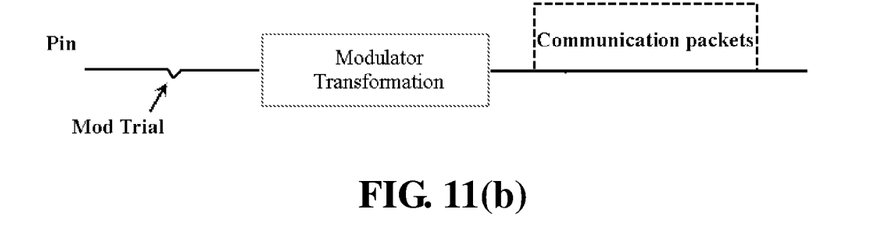
FIG. 11(b) is a graph with respect to time of an electrical parameter, Pin, showing the application of a trial modulation by the modulation circuit in FIG. 10, in which the trial modulation shows that the modulation direction is not in a desired modulation direction, and the modulation circuit applies a modulation transformation.

As an example, if the objective is to also make sure that V1 on the receiver side is rising when communication modulation is done on the transmitter side, the input power to the transmitter, Pin, can be monitored. It can be assumed that when V1 rises, Pin also increases. As shown in FIG. 11, a "Mod Trial" can also be applied by the modulation circuit 1 on the transmitter side to check whether the modulation direction is correct, that is, in the desired modulation direction. If the modulation direction is correct, the communication modulation can continue in its existing modulation mode. If the direction is not correct, however, a "Modulation Transformation" is applied, similar to what is shown in FIG. 6(*b*) and FIG. 6(*c*).

Alternatively, of course, the double modulator approach similar to what is shown in FIG. 8 and FIG. 9 and described in detail above can also be used. It must be noted that the monitored electrical parameter 3 of the wireless power transmitter circuit 10 is not limited to the input power. It can be any electrical parameter which has a known relationship with the objective electrical parameter on the receiver, that is, the electrical parameter on the receiver that has a desired modulation direction.

The present invention also provides, in another aspect, a method of modulating a wireless power transfer circuit, the method including: in an operative state, modulating an electrical parameter of the wireless power transfer circuit in a modulation direction; applying a trial modulation to the electrical parameter to determine whether the modulation direction matches (e.g., is in) a desired modulation direction; and applying a modulation translation if the modulation direction differs from (e.g., does not match or is not in) the desired modulation direction, the modulation translation changing the modulation mode such that the modulation direction matches desired modulation direction.

It will be appreciated that the foregoing description also describes a preferred embodiment of this aspect of the invention. In particular, the method includes: in the operative state, modulating the electrical parameter 3 of the wireless power transfer target circuit 4 in a modulation direction; applying a trial modulation to the electrical parameter 3 to determine whether the modulation direction matches a desired modulation direction; and applying a modulation translation if the modulation direction differs from the desired modulation direction, the modulation translation changing the modulation mode such that the modulation direction matches desired modulation direction.

In one embodiment, the electrical parameter 3 is modulated in the operative state by using the modulation circuit 1 having the switching circuit 2 having a first state and a second state. In a modulation mode, the first state defines a normal state and the second state defines the operative state. The modulation translation changes the modulation mode (e.g., is applied) by swapping the first and second states such that the second state defines the normal state and the first state defines the operative state.

In one embodiment, where the electrical parameter 3 has a normal value in the normal state, the method includes modifying the value of the electrical parameter 3 before, in time, the modulation translation such that the electrical parameter has the normal value in the normal state after the modulation translation. In another embodiment, where the electrical parameter has a normal value in the normal state, the method includes modifying the value of the electrical parameter 3 after, in time, the modulation translation such that the electrical parameter has the normal value in the normal state after the modulation translation.

In a further embodiment, the electrical parameter 3 is modulated in the operative state by using the modulation circuit 1, but the switching circuit 2 has a third state, as well as a first state and a second state. In a modulation mode, the first state defines a normal state and the second state defines the operative state. The modulation translation changes the modulation mode by swapping the second and third states such that the third state defines the operative state.

Although the invention has been described with reference to specific examples, it will be appreciated by those skilled in the art that the invention can be embodied in many other forms. It will also be appreciated by those skilled in the art that the features of the various examples described can be combined in other combinations.

The invention claimed is:

1. A modulation circuit for modulating a wireless power transfer circuit,
   the modulation circuit having a switching circuit having a first state and a second state;
   the modulation circuit having a modulation mode in which the first state defines a normal state and the second state defines an operative state,
   wherein in the operative state, the modulation circuit is configured to modulate an electrical parameter of the wireless power transfer circuit in a modulation direction,
   the modulation circuit further configured to apply a trial modulation to the electrical parameter to determine whether the modulation direction matches a desired modulation direction, and
   the modulation circuit further configured to apply a modulation translation responsive to the modulation direction differing from the desired modulation direction, the modulation translation changing the modulation mode by swapping the first and second states such that the second state defines the normal state and the first state defines the operative state.

2. The modulation circuit of claim 1 wherein the switching circuit includes a switch, and the modulation circuit includes a modulating component connected in series with the switch, the modulating component and the switch forming a modulating unit.

3. The modulation circuit of claim 2 wherein the modulating unit is connected between a wireless power transfer coil and a rectification circuit in the wireless power transfer circuit.

4. The modulation circuit of claim 2 wherein the modulating unit is connected between a rectification circuit and a load in the wireless power transfer circuit.

5. The modulation circuit of claim 2 wherein the modulating component is a resistor or a capacitor.

6. The modulation circuit of claim 1 wherein the electrical parameter has a normal value in the normal state, and the value of the electrical parameter is modified before the modulation translation such that the electrical parameter has the normal value in the normal state after the modulation translation.

7. The modulation circuit of claim 1 wherein the electrical parameter has a normal value in the normal state, and the value of the electrical parameter is modified after the modulation translation such that the electrical parameter has the normal value in the normal state after the modulation translation.

8. The modulation circuit of claim 1 wherein the electrical parameter has a modulated value in the operative state and a trial modulation value during the trial modulation, the trial modulation value being smaller than the modulated value.

9. The modulation circuit of claim 1 wherein the electrical parameter is voltage, current, or power.

10. The modulation circuit of claim 1 wherein the modulation direction is one of increasing or decreasing the electrical parameter.

11. The modulation circuit of claim 1 including a modulation controller that applies a trial modulation to the electrical parameter to determine whether the modulation direction is in a desired modulation direction, and applies a modulation translation if the modulation direction is not in the desired modulation direction, the modulation translation changing the modulation mode such that the modulation direction is in the desired modulation direction.

12. The modulation circuit of claim 1 wherein the wireless power transfer circuit is a wireless power receiver circuit.

13. The modulation circuit of claim 1 wherein the wireless power transfer circuit is a wireless power transmitter circuit.

14. A modulation circuit for modulating a wireless power transfer circuit,
   the modulation circuit having a switching circuit having a first state, a second state, and a third state,
   the modulation circuit having a modulation mode in which the first state defines a normal state and the second state defines an operative state,
   wherein in the operative state, the modulation circuit is configured to modulate an electrical parameter of the wireless power transfer circuit in a modulation direction,
   the modulation circuit further configured to apply a trial modulation to the electrical parameter to determine whether the modulation direction matches a desired modulation direction, and
   the modulation circuit further configured to apply a modulation translation responsive to the modulation direction differing from the desired modulation direction, the modulation translation changing the modulation mode by swapping the second and third states such that the third state defines the operative state.

15. The modulation circuit of claim 14 wherein the switching circuit includes two switches each having on and off states, the two switches in combination defining the first, second, and third states.

16. A method of modulating a wireless power transfer circuit, the method including:
- modulating, in an operative state, an electrical parameter of the wireless power transfer circuit in a modulation direction;
- applying a trial modulation to the electrical parameter to determine whether the modulation direction matches a desired modulation direction; and
- applying a modulation translation responsive to the modulation direction differing from the desired modulation direction, the modulation translation causing the modulation direction to match the desired modulation direction.

17. The method according to claim 16 wherein the electrical parameter is modulated in the operative state by using a modulation circuit having a switching circuit having a first state and a second state, wherein in a modulation mode, the first state defines a normal state and the second state defines the operative state, and wherein the modulation translation changes the modulation mode by swapping the first and second states such that the second state defines the normal state and the first state defines the operative state.

18. The method according to claim 17 wherein the electrical parameter has a normal value in the normal state, and wherein the method further comprises:
- modifying the value of the electrical parameter before the modulation translation such that the electrical parameter has the normal value in the normal state after the modulation translation.

19. The method according to claim 17 wherein the electrical parameter has a normal value in the normal state, and wherein the method further comprises:
- modifying the value of the electrical parameter after the modulation translation such that the electrical parameter has the normal value in the normal state after the modulation translation.

20. The method according to claim 16 wherein the electrical parameter is modulated in the operative state by using a modulation circuit having a switching circuit having a first state, a second state, and a third state, and wherein in a modulation mode, the first state defines a normal state and the second state defines the operative state.

21. The method according to claim 20 wherein the modulation translation changes the modulation mode by swapping the second and third states such that the third state defines the operative state.

* * * * *